Dec. 16, 1958 H. TROEGER 2,864,259
POWER TRANSMISSION
Filed April 8, 1955 3 Sheets-Sheet 3
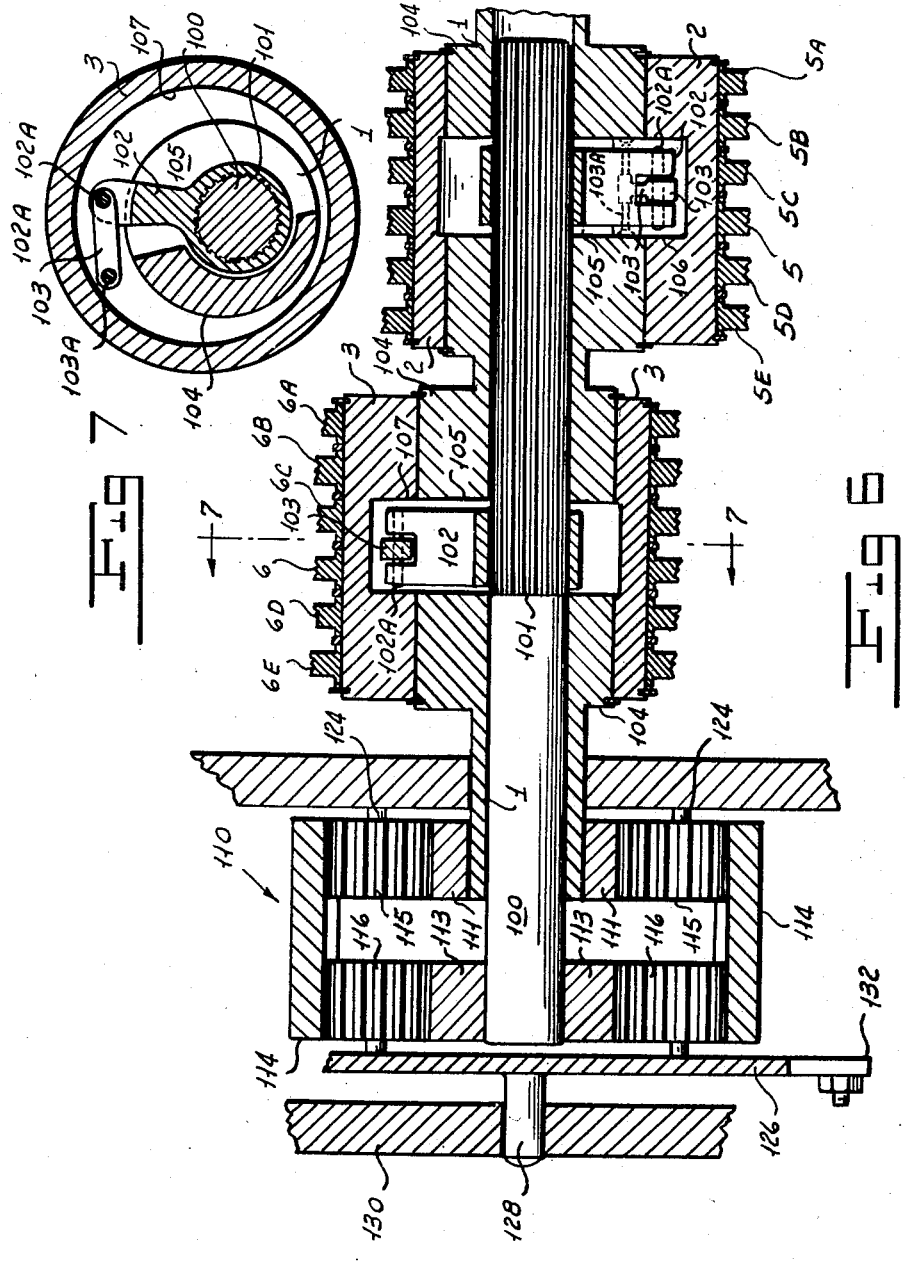
INVENTOR
HENRY TROEGER
BY *Herbert L Davis*
ATTORNEY

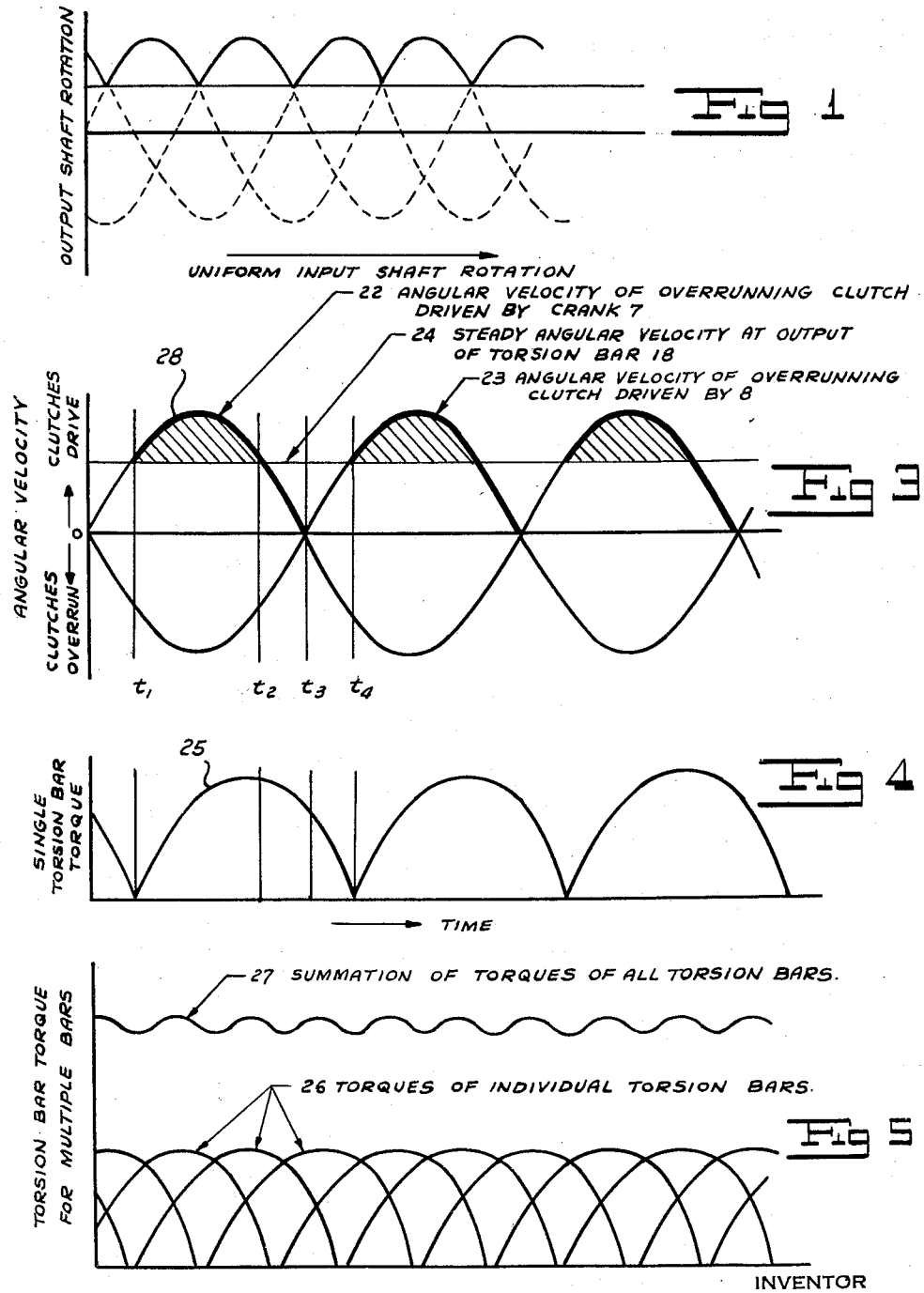

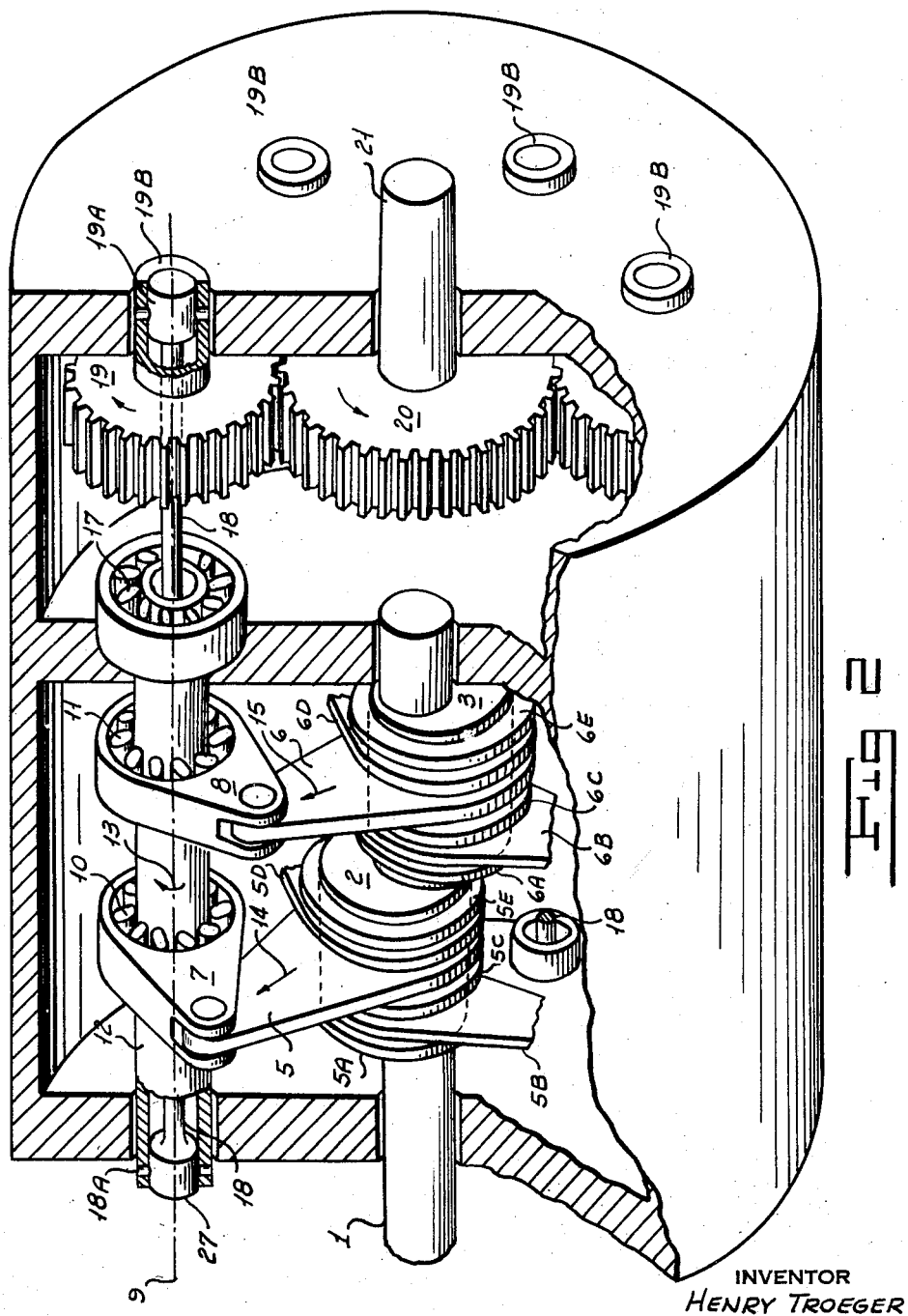

United States Patent Office 2,864,259
Patented Dec. 16, 1958

2,864,259

POWER TRANSMISSION

Henry Troeger, Ramsey, N. J., assignor to Bendix Aviation Corporation, Teterboro, N. J., a corporation of Delaware Application April 8, 1955, Serial No. 500,167

5 Claims. (Cl. 74—113)

The present application relates to improvements in a variable ratio transmission of the variable throw overrunning clutch type.

In such a transmission there may be provided an input shaft having variable throw cams arranged to impart a cyclic angular motion to an input member of an overrunning clutch which serves to rectify the cyclic motion to a unidirectional and intermediate output rotation. Continuous rotation of the output shaft is obtained by combining the output of several overrunning clutches whose input members are cycled out of phase with each other. Changes in ratio of the input shaft to the output shaft may be effected by varying the throw of the driving crank or cam. However, in such an arrangement only that overrunning clutch having the greatest velocity will drive the input shaft and the load will be cyclically and suddenly transferred from one overrunning clutch to another. Therefore, in such an arrangement, it will be seen that since only one running clutch can carry the load at any one time, each must be of sufficient capacity to carry the maximum load. Thus because of the sudden load transferred by the overrunning clutch, there will result a shock on the clutch tending to cause rapid clutch deterioration and failure.

In the aforenoted arrangement, it will be seen that only one overrunning clutch carries the full load at any instant and that transferral of the output motion by the overrunning clutches occurs suddenly. It should be noted also that depending upon the number of phases involved, the variation in output velocity can be a relatively high proportion of the average velocity.

An object of the present invention is to provide a novel power transmission so arranged as to reduce or eliminate the aforenoted deficiencies and a transmission in which the ratio is variable in a self-regulatory manner without any additional regulating means.

Another object of the invention is to provide a novel power transmission in which the transmission ratio may be varied dependent upon the output torque applied and without the addition of further controls.

Another object of the invention is to provide novel means whereby the transmission ratio may be varied so as to maintain a constant output speed condition with varying input and output load conditions.

Another object of the invention is to provide a novel variable ratio transmission of the overrunning clutch type having clutch driven torsion bars so arranged that the overrunning clutches initiate engagement when the torsion bars are completely unloaded thereby reducing impact on the clutches to a very low value.

Another object of the invention is to provide a novel variable ratio transmission having a plurality of overrunning clutches so arranged that more than one overrunning clutch can be driving at any instant so as to reduce the overrunning clutch torque for a given power transfer.

Another object of the invention is to provide a novel variable ratio transmission in which due to the aforenoted overlap of torque impulses the output torque variation has a small amplitude.

Another object of the invention is to provide a variable ratio transmission so arranged as to vary the ratio without auxiliary control means or variable eccentrics and a variable ratio transmission readily adapted for use with suitable auxiliary control means to vary the ratio for operation under a wider range of operating conditions.

The above and other objects and features of the invention will appear more fully hereinafter from a consideration of the following description taken in connection with the accompanying drawing wherein one embodiment of the invention is illustrated by way of example.

In the drawings:

Figure 1 is a graph illustrative of the conditions occurring in heretofore known variable throw transmissions of the conventional type.

Figure 2 is an exploded detail assembly view of the new variable ratio transmission showing in detail one of a group of six similar overrunning clutch drive assemblies.

Figure 3 is a graph illustrative of the operation of one torsion bar of the transmission under assumed operating conditions during a cycle of operation.

Figure 4 is a graph illustrative of the torque produced during the cycle of operation of Figure 3 as to one torsion bar.

Figure 5 shows graphically the torques produced by several of the torsion bars in the transmission operating out of phase with each other.

Figure 6 is a modification of Figure 2 showing a variable control means to vary the eccentricity of the several motion transmitting eccentrics and thereby the ratio of the transmission.

Figure 7 is a sectional view taken along the lines 7—7 of Figure 6 and looking in the direction of the arrows.

Referring now to the variable ratio transmission shown in Figure 2, there is provided an input shaft 1 driven by a prime mover (not shown) on which input shaft there are secured eccentrics 2 and 3 which are angularly offset in relation to each other. Freely mounted on the eccentrics 2 and 3 are connecting rods 5 and 6 of equal length which are arranged also angularly offset and are to oscillate cranks 7 and 8 about a center line 9. The cranks 7 and 8 in turn drive overrunning clutches 10 and 11 of a conventional type so as to turn the tubular shaft 12 in a direction indicated by the arrow 13 upon movement of the connecting rods or actuating links 5 and 6 in the direction shown by arrows 14 and 15. When the connecting rods or links 5 and 6 move in an opposite direction during their return stroke, the overrunning clutches 10 and 11 slip and no motion is imparted to the tubular shaft 12. Between the tubular shaft 12 and the housing of the transmission, there is fixedly mounted in a wall of the housing at 16 an overrunning brake means 17 whose function is to prevent rotation of the tubular shaft 12 in a direction reverse to that indicated by the arrow 13. The tubular shaft 12 is connected at 18A to a torsion bar 18 which projects through the tubular shaft 12 and has affixed at its end 19A a tubular shaft portion 19B of a gear 19. The gear 19 engages and drives a collector gear 20 which is connected to a drive output shaft 21.

Additional drive elements, similar to those described, are disposed about the center axis of the input shaft 1 and are driven through connecting rods 5A—E and 6A—E similar to the rods or links indicated by the numerals 5 and 6 and likewise freely mounted on the eccentrics 2 and 3. Such drive elements are arranged to drive gears similar to 19, all of which are engaged with the collector gear 20. The output shaft 21 driven through the collector gear 20 by the several drive elements is connected to a load not shown.

Operation

In operation rotation of the input shaft 1 by suitable means will result in imparting to the tubular shaft 12 of each of the several drive elements a cyclic rotation in the direction indicated by the arrow 13 which will twist torsion bar 18. The overrunning or brake means 17 by preventing rotation of shaft 12 in a direction reverse to that indicated by the arrow 13 will cause spring energy to be stored in the torsion bar 18.

The reacting torque of the torsion bar 18 will then be applied to gear 19 which in turn will apply rotational torque to the collector gear 20. The other gears of the several drive elements corresponding to gear 19 will similarly apply to collector gear 20 torques of a value dependent upon the energy stored in the torsion bars 18 driving such gears 19. The total torque available in the collector gear 20 will then be due to the summation of the torques applied by all of these gears 19 driving the collector gear 20. The torque thus created will drive output shaft 21.

In order to better describe this operation and characteristics of the transmission, steady state conditions of constant input speed, constant output speed, fixed throw of the eccentrics and a relatively large moment of inertia of the load will first be assumed. Under such conditions, a relatively large moment of inertia of the load will tend to maintain the output speed steady though torque at the output varies cyclically. For these assumed conditions, operation of one torsion bar 18 of the transmission may be represented graphically as in Figure 3.

In the graph shown by Figure 3, cyclic curves 22 and 23 represent the angular motion of the cranks 7 and 8 about the tubular shaft 12. The straight line 24, in the graph of Figure 3, represents the steady rotation of the output end of the torsion bar 18. Assume for the moment then that the torsion bar is unloaded and being driven by the output at a steady angular velocity and that there is no input motion to cranks 7 and 8. Under these assumed conditions, the shaft 12 will be rotating at the same velocity as the torsion bar because the overrunning clutches 10 and 11 will permit the shaft 12 to turn freely. Now if the input shaft 1 is loaded to cause cranks 7 and 8 to oscillate, as shown by curves 22 and 23 of Figure 3, so that for some time between $t_1$ and $t_2$ the angular velocity of the crank 7 as shown graphically by curve 22 is greater than the angular velocity of the output end 19A of the torsion bar 18, then the overrunning clutch 10 will drive shaft 12 and hence the input end 27 of the torsion bar 18.

It will be seen then that during the time between $t_1$ and $t_2$ that the torsion bar input 27 has a higher angular velocity than the output, the angular displacement of the torsion bar input is greater than the output so as to result in a twisting of the torque bar 18 which will create a torque reaction at the output 19A. Thus because the total input angular displacement of the torsion bar 18 between $t_1$ and $t_2$ is greater than the total output displacement, there will still be some twist remaining in the torsion bar 18 at time $t_2$.

In view of the foregoing, the torque reaction due to the aforenoted twist in the torsion bar 18 will maintain the overrunning clutch 10 driving until the angular velocity of crank 7 becomes zero at $t_3$, at which time the antireverse overrunning brake means 17 will prevent reverse rotation of the tubular shaft 12 or torsion bar input 27. At time $t_3$, then, there may still be some twist remaining in torsion bar 18 and the torque reaction of which will be taken by the anti-reverse overrunning clutch 17. All the energy thus stored in the torsion bar 18 would be delivered to the output until the torsion bar 18 becomes completely unwound sometime between $t_3$ and $t_4$. At time $t_4$ the second crank 8 would drive overrunning clutch 11 and repeat the above cycle.

There is shown graphically in Figure 4 by curve 25 the torque produced by the above cycle for one torsion bar, while in Figure 5 there is shown graphically by the curves 26 the torques produced by several torsion bars 18 operating out of phase with each other. The summation of these torques is represented by curve 27 of Figure 5.

A characteristic of the transmission mechanism thus described is that for a fixed eccentricity of the elements 2 and 3 an increase or decrease in output load will result in lowering or raising respectively a steady output velocity of the shaft 21, as represented by straight line 24 in Figure 3. This change in output velocity will change the time $t_1$ and $t_2$ so as to increase or decrease respectively the shaded area 28 which will represent an increase or decrease in torsion bar twist and, hence, the torque applied to the output. By proper selection of torsion bar resiliency and design of components to provide a desirable fixed angular torque of the crank 7 and 8 for a particular application, the transmission can be made to vary its ratio dependent upon the output torque applied and without the addition of any further controls. Some advantages of this transmission are as follows:

(1) The driving overrunning clutches 10 and 11 initiate engagement when the torsion bars 18 are completely unloaded thereby reducing impact on the clutches to a very low value.

(2) More than one overrunning clutch can be driving at any instant which reduces the size of the overrunning clutches 10 and 11.

(3) Each driving overrunning clutch is driving for a longer percentage of the time cycle which reduces the overrunning clutch torque for a given power transfer.

(4) Due to the overlap of torque impulses the output torque variation has a small amplitude.

(5) The transmission can be made to vary ratio without auxiliary control means or variable eccentrics.

In order to cover a wider range of operating conditions, the eccentricity of the eccentrics 2 and 3 may be made variable and control means added to vary the eccentricity so as to maintain the driven speed of the output shaft 21 at a predetermined value.

Modified form

There is shown in Figures 6 and 7 a modification of the arrangement of the input shaft 1 of Figure 2 in which like numerals indicate corresponding parts and which modified arrangement may be substituted for the drive shaft arrangement shown in the drawing of Figure 2. In the modified form shown in Figure 6, the input shaft 1 is connected to a suitable source of power, not shown, at the righthand end thereof and there is provided suitable means to vary the eccentricity of the eccentric elements 2 and 3 and the operative relation thereof to the several links 5 and 6 respectively. In order to effectuate the foregoing there is concentrically mounted within the input shaft 1 a second shaft 100 so arranged as to be rotatably adjusted relative to the shaft 1 and having suitable splines 101 cooperating with corresponding splines in arms 102. The arms 102 are so arranged as to operatively connect shaft 100 to the respective eccentric cams 2 and 3, as shown in Figures 6 and 7, through linkages 103. A pin 102A pivotally connects the arm 102 to the linkage 103 which in turn is pivotally connected by a pin 103A to the respective cams 2 and 3 controlled thereby, as best shown in Figure 7.

The eccentric cam elements 2 and 3 are adjustably mounted on additional eccentric elements 104 affixed to the drive shaft 1. Suitable slots 105 are formed in the eccentric cam elements 104 so that the arms 102 may extend therethrough and into a slot 106 and 107 in the respective cams 2 and 3 for adjustment therein. The arms 102 operatively connect shaft 100 through linkage 103 to the cams 2 and 3 respectively, and are so arranged that upon rotation of shaft 100 within shaft 1 there may be imparted a corresponding adjustment of the position of the eccentric cam elements 2 and 3 on the eccentric elements 104. Such adjustment of the cams 2 and 3 relative to the elements 104 serves to vary the eccentricity of the elements 2 and 3 relative to the concentric shafts 1 and 100 and in turn the transmission ratio of the mechanism.

As shown in Figure 6, the shaft 100 projects through the shaft 1 and at the end of the shaft 1 opposite from the drive end there is provided a suitable differential gear train indicated generally by the numeral 110 whereby the angular relation of the shaft 100 relative to the shaft 1 may be varied and thereby cause an adjustment through the arm 102 connected to the shaft 100 of the relative position of the eccentric cam elements 2 and 3 on the eccentric elements 104. The aforenoted differential gear train 110 may include a sun gear 111 affixed to the drive shaft 1 and a sun gear 113 affixed to the adjustment shaft 100. Like planetary gears 115 and 116 engage the respective sun gears 111 and 113, while a ring gear 114 engages both the planetary gears 115 and 116 and is rotated freely through rotation imparted to the planetary gear 115 by the sun gear 111. The sun gear 113 has a like gear ratio to that of the sun gear 111 and the arrangement is such that in normal operation the rotation of the ring gear 114 in turn imparts rotation through planetary gear 116 to the sun gear 113 and shaft 100 in synchronism with the rotation of the drive shaft 1 and the sun gear 111.

The planetary gears 115 are rotatably mounted on fixed shafts 124 projecting from the casing of the transmission mechanism while the planetary gears 116 are carried by a cage 126 adjustably mounted on a shaft 128 carried by a fixed member 130. An adjustment arm 132 projects from the cage 126 so that the relative position of the planetary gearing 116 may be adjusted about the sun gear 113 and relative to the planetary gears 115 so as to in turn impart through shaft 100 an adjustment of position to the respective eccentrics 2 and 3 relative to the eccentrics 104 and thereby in turn vary the effective eccentricity of the eccentrics 2 and 3 and the ratio of the transmission mechanism heretofore described.

The cage 126 may be adjusted manually or, if desired, may be controlled by a suitable governor mechanism responsive to the speed of output shaft 21 so as to vary the eccentricity of the eccentrics 2 and 3 in such a manner as to maintain the speed of the output shaft 21 at a preselected value under varying output load and input speed conditions.

Although only two embodiments of the invention have been illustrated, various changes can be made in the design and arrangement of parts without departing from the spirit and scope of the invention as the same will now be understood by those skilled in the art.

What is claimed is:

1. A power transmission mechanism comprising an input shaft, a pair of eccentric members mounted on said shaft, said eccentric members being angularly offset with respect to each other, a plurality of driving elements equispaced around said input shaft, each of said driving elements including a pair of actuating links of equal length, one of said links freely mounted on one of the eccentric members, the other of said links freely mounted on the other of the eccentric members, a tubular shaft, a pair of clutches mounted on said tubular shaft, one of said actuating links operatively connected to one of said clutches and the other of said actuating links operatively connected to the other of said clutches so that said links are angularly offset, said clutches imparting multiphased movement from said actuating links to said tubular shaft to impart rotary movement to said tubular shaft in one direction, brake means cooperating with said tubular shaft to prevent rotary movement thereof in an opposite direction, a torsion bar extending through said tubular shaft and operatively connected at one end to said tubular shaft, and an output gear operatively connected to the other end of the torsion bar; a collector gear driven by the output gear of each of said driving elements, and an output shaft connected to said collector gear and driven thereby.

2. A mechanism comprising a plurality of motion transmitting devices, each of said devices including a tubular shaft, a plurality of overrunning clutches mounted thereon to impart rotary movement to the shaft in one direction, means to prevent rotation of said shaft in a direction opposite to said one direction; a driven element, a resilient bar extending through said tubular shaft and operatively connected at one end to said tubular shaft and at the opposite end to said driven element so as to drivingly connect said shaft to said driven element; drive means for producing oscillating multiphased motions of variable amplitude to drive said overrunning clutches of said devices, and an output shaft including means collectively driven by the driven elements of said power transmitting devices.

3. In a power transmission mechanism of the type including a first shaft, overrunning clutch means to impart rotary movement to said first shaft in one direction, means to prevent rotation of said first shaft in a direction opposite to said one direction, drive means arranged in an operative relation to said clutch means, a second shaft, and resilient means drivingly connecting said first shaft to said second shaft; the improvement comprising a tubular input shaft operably connected to said drive means, said drive means including first eccentric elements affixed to said tubular input shaft, second eccentric elements positioned on said first eccentric elements and adjustable relative thereto, and connecting rods freely mounted on said second eccentric elements and drivingly connecting said input shaft to said overrunning clutch means, a control shaft extending into said tubular input shaft and operatively connected to said second eccentric elements, and manually operable means to impart rotary movement to said control shaft within said tubular input shaft and to vary the adjusted position of said second eccentric elements relative to said first eccentric elements to change the effective eccentricity of said second eccentric elements and thereby the transmission ratio of the mechanism.

4. A mechanism comprising a plurality of motion transmitting devices equispaced around an input shaft, each of said devices including a tubular shaft, first and second overrunning clutches mounted thereon at the center part thereof to impart rotary movement to the shaft in one direction, brake means to prevent rotation of said shaft in a direction opposite to said one direction, a driven element spaced from said clutch means, and a resilient bar extending through said tubular shaft and operatively connected at one end to the end of said tubular shaft which is removed from said driven element and at the other end to said driven element so as to drivingly connect said shaft to said driven element; drive means connected to said input shaft for producing oscillating multiphased motions of variable amplitude connected to drive said overrunning clutches of said devices; said drive means including a first eccentric member and a second eccentric member and links of equal length connected from each of said first and second eccentric members to each of said first and second overrunning clutches; said eccentric members being angularly offset in relation to each other whereby said links are also angularly offset; and an output shaft having means collectively driven by the driven elements of said power transmitting devices.

5. A power transmission mechanism comprising an input shaft, a pair of eccentric members mounted on said shaft and angularly offset in relation to each other, a plurality of driving elements equispaced around said input shaft, each of said driving elements including a pair of actuating links of equal length, one of said links freely mounted on one of the eccentric members, the other of said links freely mounted on the other of the eccentric members, a tubular shaft, a pair of clutches mounted on said tubular shaft, one of said actuating links operatively connected to one of said clutches and the other of said actuating links operatively connected to the other of said clutches so that said links are angularly offset, said clutches imparting multiphased movement from said actuating links to said tubular shaft to impart rotary movement to said tubular shaft in one direction, brake means cooperating with said tubular shaft to prevent rotary movement thereof in an opposite direction, a torsion bar extending through said tubular shaft and operatively connected at one end to said tubular shaft, and an output gear operatively connected to the other end of the torsion bar; a collector gear driven by the output gear of each of said driving elements, an output shaft connected to said collector gear and driven thereby, said input shaft being hollow and having a control shaft projecting through said input shaft, means angularly adjustable by said control shaft to vary the eccentricity of each of said eccentric members relative to said input shaft and thereby the transmission ratio of the mechanism and means including a differential gear train for varying the angular relation of the control shaft relative to the input shaft.

References Cited in the file of this patent

UNITED STATES PATENTS

| | | |
|---|---|---|
| 794,257 | Sinclair | July 11, 1905 |
| 1,776,360 | Joyner | Sept. 23, 1930 |
| 1,987,518 | Reilly | Jan. 8, 1935 |
| 2,047,792 | McFarlane | July 14, 1936 |
| 2,369,679 | Matteucci | Feb. 20, 1945 |
| 2,414,003 | Thompson | Jan. 7, 1947 |
| 2,698,526 | Beier | Jan. 4, 1955 |

FOREIGN PATENTS

| | | |
|---|---|---|
| 19,387 1904 | Great Britain | Aug. 10, 1905 |